US011070165B2

(12) United States Patent
Orriols et al.

(10) Patent No.: US 11,070,165 B2
(45) Date of Patent: Jul. 20, 2021

(54) AUTONOMOUS AND MOVABLE DEVICE FOR GENERATING, STORING AND DISTRIBUTING ELECTRICAL POWER TO DEDICATED MOVABLE BATTERIES

(71) Applicant: SOLARPLEXUS, Saint Benoit (FR)

(72) Inventors: Alain Orriols, Saint-Denis (FR); Nicolas Namy, Saint-Denis (FR)

(73) Assignee: SOLARPLEXUS, Saint Benoit (FR)

( * ) Notice: Subject to any disclaimer, the term of this patent is extended or adjusted under 35 U.S.C. 154(b) by 36 days.

(21) Appl. No.: 16/461,096

(22) PCT Filed: Nov. 23, 2017

(86) PCT No.: PCT/FR2017/053230
§ 371 (c)(1),
(2) Date: May 15, 2019

(87) PCT Pub. No.: WO2018/096281
PCT Pub. Date: May 31, 2018

(65) Prior Publication Data
US 2020/0059192 A1    Feb. 20, 2020

(30) Foreign Application Priority Data
Nov. 24, 2016   (FR) .................................... 1661453

(51) Int. Cl.
*H02S 10/40*    (2014.01)
*H02S 40/38*    (2014.01)
(Continued)

(52) U.S. Cl.
CPC ................ *H02S 10/40* (2014.12); *G05F 1/66* (2013.01); *H02J 3/385* (2013.01); *H02S 40/38* (2014.12); *H02J 7/00* (2013.01)

(58) Field of Classification Search
CPC ......... G05F 1/66; H02J 13/0003; H02J 3/385; H02J 7/00; H02J 7/35; H02J 2007/0062;
(Continued)

(56) References Cited

U.S. PATENT DOCUMENTS 7,492,120 B2 * 2/2009 Benn ....................... F24S 20/50
                                                            320/101
9,157,418 B2 * 10/2015 Petersen ................. H02S 20/00
(Continued)

FOREIGN PATENT DOCUMENTS

EP    2 822 178 A1    1/2015
FR    3 011 699 A1    4/2015
(Continued)

OTHER PUBLICATIONS

International Search Report and Written Opinion dated Feb. 22, 2018 issued in corresponding application No. PCT/FR2017/053230; w/ English partial translation and partial machine translation (24 pages).

*Primary Examiner* — Chun Cao
(74) *Attorney, Agent, or Firm* — Seckel IP, PLLC

(57) ABSTRACT

The invention relates to an autonomous and movable device (1) for generating, storing and distributing electrical power, comprising means (2) for generating electrical power, namely photovoltaic panels (20), resting on at least one supporting element (3), namely a standardized shipping container (3 qql, 32). The latter encloses internal means (6) for storing the electrical power generated by said generating means (2), said supporting element (3) also enclosing means for converting signals generated by the generating means (2) into signals suitable for supplying power to the storing means, and at least one electrical connector (8) for connecting external power-storing devices. The supporting element (3) also incorporates a controlling system comprising means for managing the storage and distribution of the power (Continued)

generated by said generating means (2), said means being connected to sensors for measuring operating parameters with which a plurality of elements of the device are equipped, and electronic telecommunication means.

23 Claims, 3 Drawing Sheets

(51) Int. Cl.
*G05F 1/66* (2006.01)
*H02J 3/38* (2006.01)
*H02J 7/00* (2006.01)

(58) Field of Classification Search
CPC ....... H02J 2310/10; H02J 7/355; H02S 10/40; H02S 40/38; Y02E 10/56; Y02E 40/70; Y04S 10/123
USPC .......................................... 700/297
See application file for complete search history.

(56) References Cited

U.S. PATENT DOCUMENTS

| | | |
|---|---|---|
| 2004/0124711 A1 | 7/2004 | Muchow et al. |
| 2007/0278989 A1* | 12/2007 | Leboff ............. H02J 7/35 320/101 |
| 2009/0027932 A1* | 1/2009 | Haines ............ H02J 9/062 363/95 |
| 2011/0146751 A1* | 6/2011 | McGuire ......... F03D 9/007 136/245 |
| 2012/0042936 A1* | 2/2012 | Feichtinger ...... B62K 27/10 136/252 |
| 2014/0028241 A1* | 1/2014 | Hixson ............ H02J 7/35 320/101 |
| 2014/0125134 A1* | 5/2014 | Van Straten ..... F03D 9/11 307/72 |
| 2015/0311721 A1 | 10/2015 | Uppal et al. |
| 2016/0248258 A1* | 8/2016 | Colin .............. H02J 3/381 |
| 2018/0212551 A1* | 7/2018 | Polk ............... H02S 20/32 |

FOREIGN PATENT DOCUMENTS

| | | |
|---|---|---|
| GB | 2523207 A | 8/2015 |
| JP | 2015-144555 A | 8/2015 |
| WO | 2014/089567 A2 | 6/2014 |

* cited by examiner

AUTONOMOUS AND MOVABLE DEVICE FOR GENERATING, STORING AND DISTRIBUTING ELECTRICAL POWER TO DEDICATED MOVABLE BATTERIES

The present invention relates to the field of autonomous systems for generating and storing electricity.

The invention more particularly relates to a device that is both movable and compact, and that is capable of permitting, on the one hand, to generate electricity from solar energy and, on the other hand, to store this generated electricity in internal storage batteries as well as in external portable batteries, the latter being specifically designed to be the only devices likely to be connected to said device.

In particular, a device has been developed that permits an intelligent and autonomous management of the generation and storage of electricity, so that the latter is available and usable in areas where access to electricity is difficult.

In addition, this device can also permit, in particular, access to an electronic telecommunications network such as Internet for a large number of users, access to a refrigerator as well as remote management, monitoring and control of its operation.

In the state of the art are traditionally known autonomous systems permitting to have access to electricity, namely by means of movable thermal systems, such as engines or turbines and permitting to be connected to existing electricity power networks to quickly cope with the lack of power generation.

These devices thus provide a carbon-based means for generating electricity, but require, however, electricity networks as well as existing infrastructures for the distribution of this electricity, and the latter are indeed lacking in some regions of the developing countries.

From the state of the art are also known systems referred to as "micro-networks", which consist in building a power plant from photovoltaic or wind energy and in setting up a simplified electricity network to connect the homes of the micro-network to the power plant.

This device effectively permits to meet the need for electricity in isolated areas, but, on the other hand, is expensive, non-movable, and takes much time to be installed. In addition, such a device raises many challenges as to the infrastructure to be implemented while maintaining a necessary level of safety.

The systems that permit a self-consumption of power, in other words, the generation and consumption of its own electricity (for example, through solar panels on the roof of the house), are also beginning to become more widespread and may be an answer in remote areas.

Nevertheless, these systems are difficult to be applied in developing areas because of the very high costs of these installations, the unsuitable roofs, the maintenance and operation requiring specialized support locally.

Thus, the solutions that are currently provided in the state of the art are not adapted to the areas not supplied with electricity in developing countries.

Also known in the state of the art is US patent application US 2004/124711, which relates to a movable power generation system including a first power generation means coupled to a movable accommodation, in which there is also a second power generation means, different from the first one, for example photovoltaic panels and means for generation from wind energy. An interface is also provided for connecting a wide variety of rechargeable devices.

However, the system provided here has several drawbacks, and namely said system does not permit to guarantee, for users, who want to recharge their device(s), availability of electrical power. It is therefore indeed possible that a user goes to the power generation system, waits for a more or less long time to connect his device, depending on the number of users already present or waiting on site, and can finally not charge his device or devices, due to non-availability of electrical power.

Patent document FR 3 011 699 describes a plant capable of being electrically autonomous, and generating power from a natural source. The plant comprises in addition a "hard" building, electric power storage means as well as an external electricity distribution terminal, to which any kind of electrical device can be connected, such as phone chargers, computers, etc.

One of the drawbacks of this plant is that it is non-movable, requiring therefore heavy building construction operations, as well as other already mentioned devices of the state of the art.

In addition, and as for the above-mentioned US patent application US 2004/124711, since the building is the element that must be supplied by priority with electricity, the external terminal receives only eventually available surplus energy. Thus, here too, a user, who wants to recharge a portable device has no guarantee of availability of energy and can potentially go to the plant and/or wait and finally be unable to recharge his device.

The present invention pretends to solve the various drawbacks of the existing device by providing a compact, movable device that can be delivered and installed quickly and easily for example in a region without electricity supply. This device permits a generation of electricity and thus access namely to light and/or a refrigeration system and/or an electronic telecommunication network for the populations living in the vicinity of this device.

Moreover, the inventors have succeeded in developing a device that, in addition to exhibit the above-mentioned advantages, autonomously and intelligently manages the storage and distribution of this electrical power namely depending on the generation and the needs of the different devices that can be connected to the device, or that can eventually be part of the device in question.

To these ends, more particularly, the present invention relates to an autonomous device for generating, storing and distributing electrical power, wherein it comprises means for generating electrical power, such as photovoltaic panels, resting on at least one supporting element, such as a standardized shipping container, the latter enclosing internal means for storing the electrical power generated by said generation means, said supporting element also including means for converting the signals from the generation means into signals capable of supplying electrical power storage means with power, at least one electrical connector for connecting external electrical power storage devices, said supporting element also incorporating a controlling system comprising means for managing the storage and distribution of the electrical power generated by said generation means connected to sensors for measuring the operating parameters, which a plurality of elements of the device are provided with, and electronic telecommunication means.

In the autonomous device for generating, storing and distributing electrical power, said external electrical power storage devices are movable batteries forming an integral part of the device and including means for identification by the controlling system and/or connection means specific to said at least one electrical connector.

Preferably, the controlling system comprises at least one server controlling, on the one hand, a plurality of microcontrollers controlling opening/closing means, such as relays, for at least the electrical lines associated with each electrical connector and, on the other hand, at least one charge and discharge regulator for the internal storage means.

As regards the signal converting means, they may advantageously consist of at least one inverter connected downstream of said generation means and upstream of the electrical connectors and at least one charge regulator connected between said inverters of the generation means and the internal storage means. In addition, according to the invention, each charge regulator is preferably associated with an inverter.

In an advantageous exemplary embodiment, on each electrical line, downstream of the signal converting means, at least one meter is connected upstream of a relay, a circuit breaker being connected between them.

Interestingly in terms of practicality of operation, said supporting element also encloses power lines supplying power to at least one refrigerator and/or at least one ventilation means and/or at least one lighting means.

The electronic telecommunication means of the device of the invention may also include at least one WEB server, a WIFI router and an internet router.

According to one possibility, the controlling system and its means for managing the storage and distribution of electrical power comprise in addition voltage, current and energy sensors.

In a particular embodiment, the device of the invention includes, as supporting elements, two containers on which a structure for holding and fastening a plurality of photovoltaic panels is fastened, said electrical connectors being positioned on the outer faces of at least one of the two containers.

In addition, said supporting element may include means for identifying at least one external device, for example external electrical power storage devices, such as movable batteries, capable of being connected to an electrical connector and including an identifier, said identification means being connected to the controlling system, which permits or not the power supply to said device, said identification means including display means.

The electrical connectors advantageously include detection means, such as LEDs, managed by the controlling system of the device.

The present invention also relates to a method for managing the electrical power generated by an autonomous device for generating, storing and distributing electrical power and including at least the following steps:
  setting a first threshold value S1 for the level of power available in the internal storage means necessary for the operation of the device;
  setting a second value S2 for the level of power available in the internal storage means so that S2>S1;
  when dropping below said first threshold value S1, disconnecting the electronic telecommunication means for a first predetermined period of time d1, then closed-loop controlling the level of power available in the internal storage means at the end of said first period of time d1, and reconnecting the electronic telecommunication means if said level is higher than the second value S2;
  if said available level of power is still lower than the second value S2, detecting the number of electrical connectors in the active phase of supplying a load, and calculating their supply time $t_a$;
  disconnecting the $n_1$ electrical connectors having the highest supply times $t_a$ for a second predetermined period of time d2, then closed-loop controlling the level of power available in the internal storage means at the end of said second period of time d2 and, if the value S2 is not reached, resuming the disconnection phase while incrementing by $n_2$ the number of disconnected electrical connectors, while keeping the electronic communication means disconnected;

As a remark, $n_1$ and $n_2$ may be identical or different.
  reconnecting the disconnected electrical connectors and the electronic telecommunication means as soon as said level of power available in the internal storage means is higher than or equal to the second value S2;
  if no electrical connector is any longer in the active phase of supplying a load, controlling the supply line of the refrigerator and disconnecting said line if the refrigerator is powered, for a third predetermined period of time d3, then closed-loop controlling the level of power available in the internal storage means at the end of said third period of time d3, and reconnecting the refrigerator, all the electrical connectors and the electronic telecommunication means as soon as said level is higher than the second value S2;
  if said level of power available is still lower than the second value S2, sending a warning of insufficient power and disconnecting the sensors, except the power sensors of the internal storage means, then closed-loop controlling the level of power available in said internal storage means and reconnecting the disconnected elements as soon as said level of power is higher than the second value S2;
  in case of detection of a zero power in the internal storage means and if the photovoltaic generation is zero, the server and the various organs of the device restart as soon as they are anew supplied with electrical power.

The values S1 and S2 are preferably varying according to time slots defined within a time period corresponding to one day.

In an advantageous example:
  the first threshold value S1 varies between 1 and 8 kWh;
  the second value S2 is higher than or equal to S1+1 kWh and varies between 2 and 10 kWh;
  the first predetermined period of time d1 varies between 2 minutes and 30 minutes;
  the second predetermined period of time d2 varies between 2 minutes and 30 minutes;
  the third predetermined period of time d3 varies between 2 minutes and 30 minutes.

In the electrical power management method, for the charging of the external electrical power storage means can preferably be implemented at least the following steps:
  reading, by the identification means, the identifier of an external electrical power storage device and recording the time t1 and the date T of reading;
  controlling, by the controlling system, the last date M of charging of said external electrical power storage device;
  calculating the period of time D=T−M and comparing D with a predetermined period of time L imposed between two charges;
  refusing the charging if D is different from L, and sending, by the controlling system, and displaying on the display means, a message indicating the next authorized date;
  otherwise, the controlling system performs a storing of the time of identification, then the assignment and the display of the electrical connector assigned through activation of the detection means of said connector.

Yet more preferably, in the above-described electrical power management method, the following steps are also implemented:

identifying a meter corresponding to the assigned electrical connector and storing the count value v1 of the charge current and the time t1;

closed-loop controlling for a predetermined time between 1 min and 4 min the count value of the charge current v2, and comparing with v1;

if v2>v1, storing the time t2 and the date of the day as the last date M of charging of said external electrical power storage device, otherwise stopping the power supply to the electrical connector without storing the date of charging;

closed-loop controlling the value of the charge current and, as soon as it decreases, stopping the power supply to the electrical connector and storing the time t3 of stopping;

if the charge current does not decrease after a predetermined period of time starting at time t2, stopping the power supply to the electrical connector, and storing the time t3 of stopping.

Furthermore, according to the invention, the dates and times are stored by the controlling system and sent via the electronic telecommunication means.

Finally, the invention also relates to a method for remote management of at least one device, as explained above, even of several devices, and operating according to a method for managing each device as described above, so that the device(s) is (are) connected via the electronic telecommunication means to a central station to which the operating parameters as well as the dates and times stored by the controlling system are sent and from which the values of the operating parameters of the device can be re-parameterized.

The present invention has many advantages.

On the one hand, the device of the invention permits to facilitate access to the electrical power for populations living in non-connected areas, for example in the developing countries. Therefore, access to light, to a refrigeration system as well as to electronic telecommunication means is also facilitated.

On the other hand, the storage and distribution of this electrical power are managed autonomously and intelligently by a system integrated into the device. Thus, when the electricity generation is higher than the needs, the excess energy can be stored in suitable storage means and is recovered when the consumption is higher than the generation.

In addition, the transport and mounting of the device, which pretends to be compact, can be carried out quickly and easily, the supporting elements of the electrical power generation means consisting of one or more standardized containers that can themselves transport the elements the device is comprised of, the equipment needed for its assembling as well as the external batteries and the lighting kits for the local populations.

These containers comply with standardized standard sizes and are therefore easily transportable intermodal transport units.

For mounting and eventually dismantling the present device, no heavy construction operation is required, nor a connection to a water distribution network and/or to an electrical network.

Further features and advantages of the invention will become evident from the following detailed description of non-restrictive embodiments of the invention, when referring to the attached figures, in which.

Figure 1:
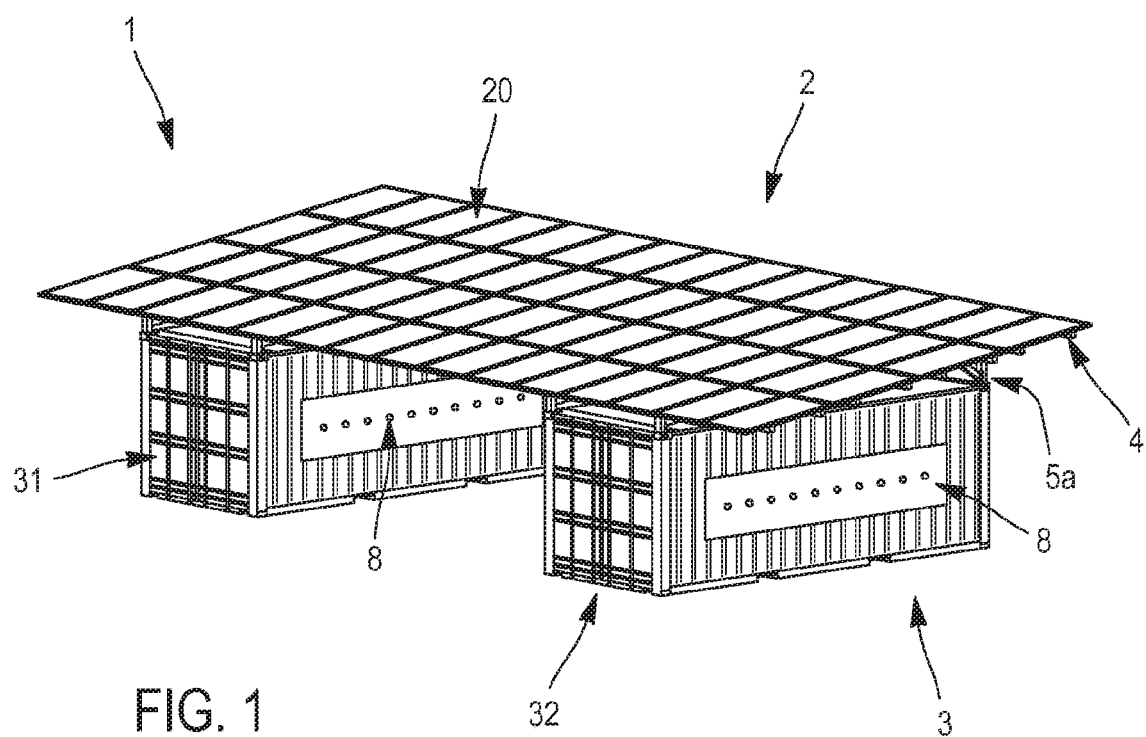
FIG. 1 is a schematic and perspective representation of a particular embodiment of the device according to the invention.

As shown in the figures of the attached drawings, and particularly in FIG. 1, the present invention relates to an autonomous device 1 for generating, storing and distributing electrical power.

The present device 1 includes at least one means for generating electrical power 2, consisting preferably of a plurality of photovoltaic panels 20, visible in FIG. 1. In this case, sixty photovoltaic panels 20 are shown in this figure, which is however in no way restrictive for the invention.

Said electricity generating means 2 rests on at least one supporting element 3, such as a container, through a holding and fastening structure 4 positioned on the upper face of the supporting element 3, the lower face of the latter being intended to rest, directly or indirectly, on the ground.

A system of studs for raising the support member 3 in order to prevent the eventual stagnation of water, mud and some crawling pests can also be installed.

In a most preferred embodiment, which is the one represented in FIG. 1, the electricity generating means 2, for example in the form of a plurality of photovoltaic panels 20, rests on two containers 31, 32, preferably positioned parallel to each other and spaced apart from each other by a determined distance, for example a few meters, preferably between 5 and 7 meters.

However, such an embodiment should not be considered as restrictive for the invention, and the present device 1 could also comprise a single container 31, for example, or a number of containers higher than two, depending in particular on the needs for electrical power of the area in which the device 1 is intended to be implanted.

A device 1 including two containers 31, 32 is however particularly interesting, because it permits to deploy a support structure 4 between said two containers 31, 32, so as to have a sufficiently large surface of photovoltaic panels 20 for generating electricity in sufficient quantity, while ensuring optimum support for said holding and fastening structure 4 on these two containers 31, 32.

The support structure 4 and, more generally, the entire device 1 are sized so as to withstand cyclonic winds present in isolated areas targeted for its installation.

Figure 3A:
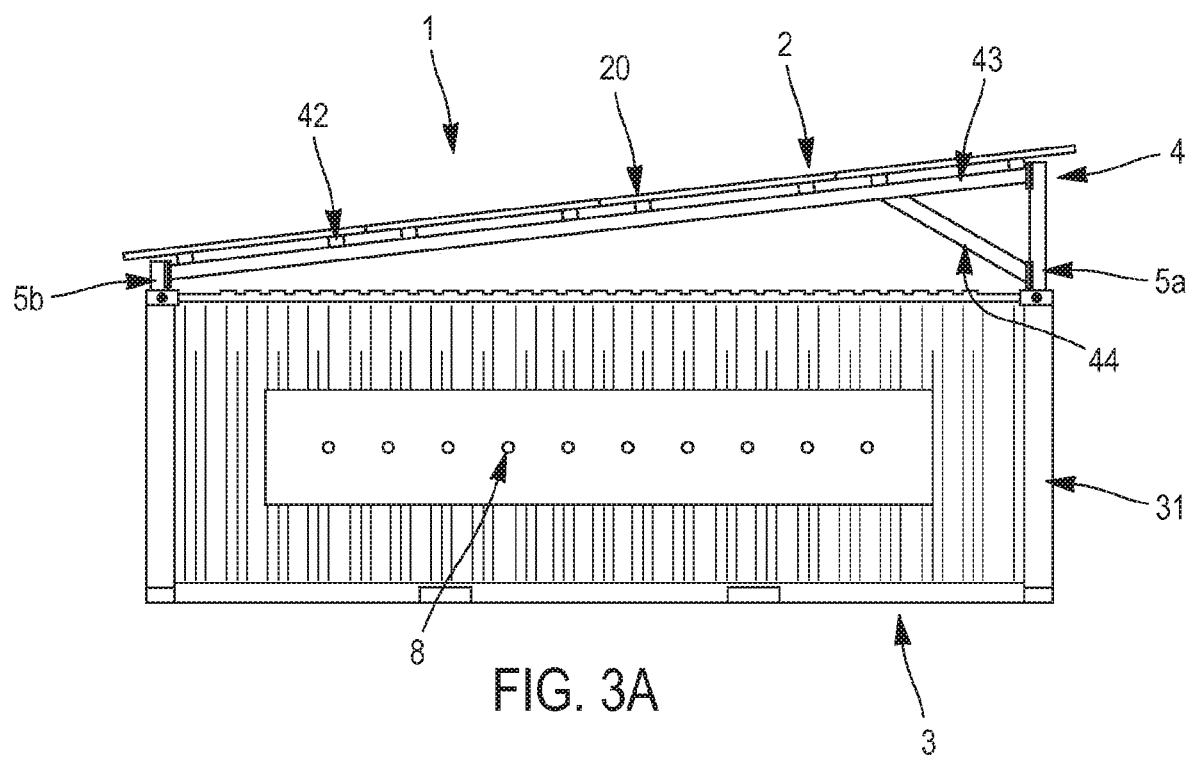
FIG. 3A represents a schematic side view of a particular embodiment of an element of the invention, showing part of a support structure for photovoltaic panels as a means for generating electricity, said structure being fastened to a container.
Figure 3B:
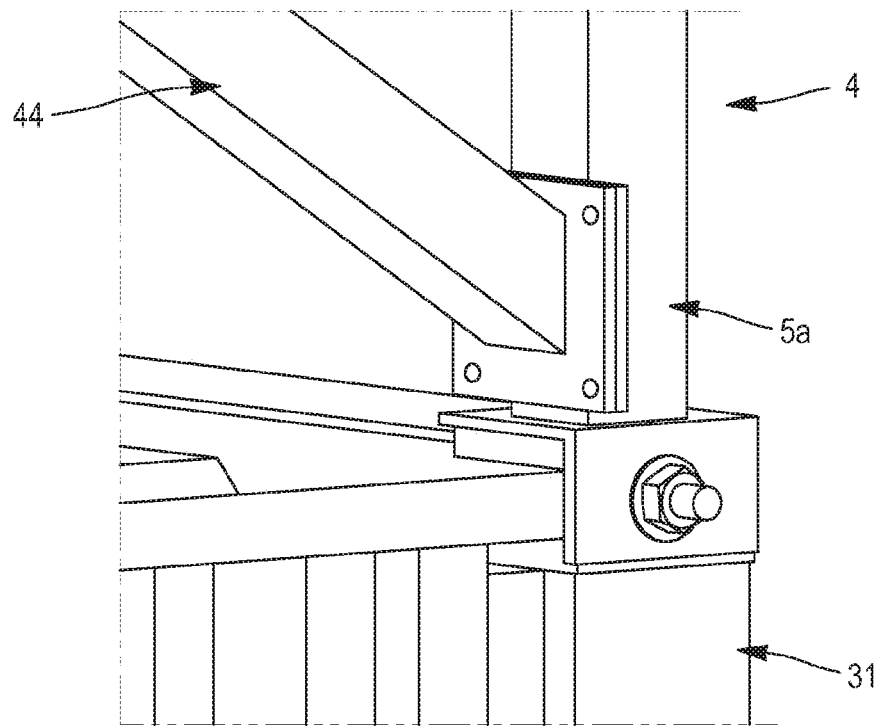
FIG. 3B represents, in an enlarged manner, a detail of this support structure, namely a lug for fastening said support structure to the container.
Figure 4:
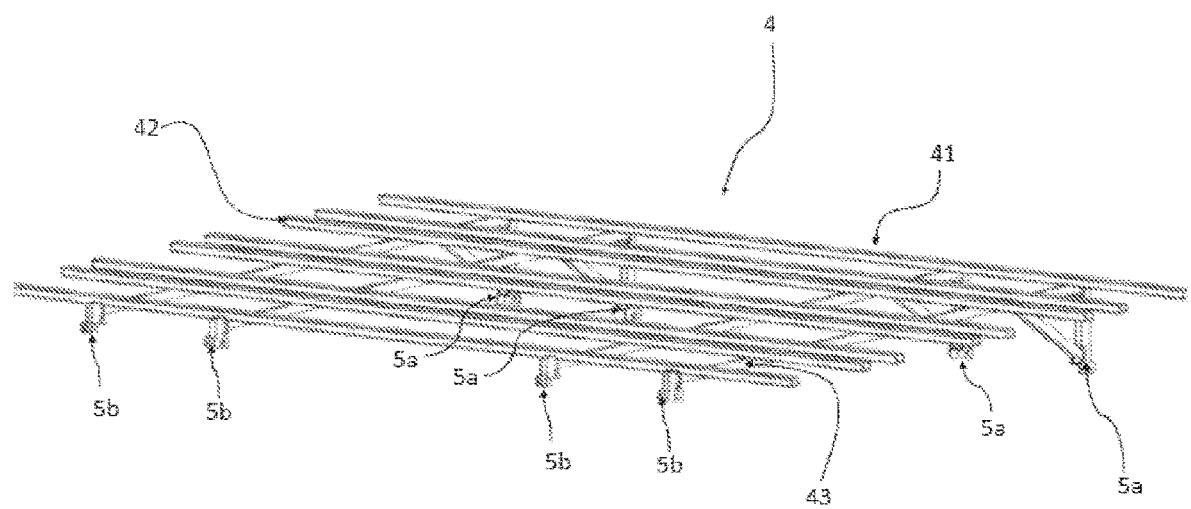
FIG. 4 represents a schematic perspective view of the support structure for photovoltaic panels.

A particular embodiment of this holding and fastening structure 4 is shown in FIGS. 3A, 3B and 4, FIG. 3A representing said structure 4 connected to the container 31, FIG. 3B representing the enlargement of a detail, in this case on the fastening of said structure 4 to the container 31 and FIG. 4 representing the structure 4 alone.

Said structure 4 is advantageously in the form of an inclined metal frame 41, formed of a plurality of purlins 42 fastened to cross members 43 that are in turn secured to the upper face of each container 31, 32 via two end posts 5a, 5b having different dimensions, in particular heights.

Said posts 5a, 5b are advantageously positioned at the four corners of each of the containers 31, 32, as shown in FIG. 1 and in FIG. 4, where it can be observed that the structure 4 in the form of a metal frame 41 includes four long end posts 5a, two for a container 31 and two for a container 32, and likewise four short end posts 5b.

Most preferably, each long end post 5a is connected to its cross member 43 via at least one inclined brace 44.

Figure 2:
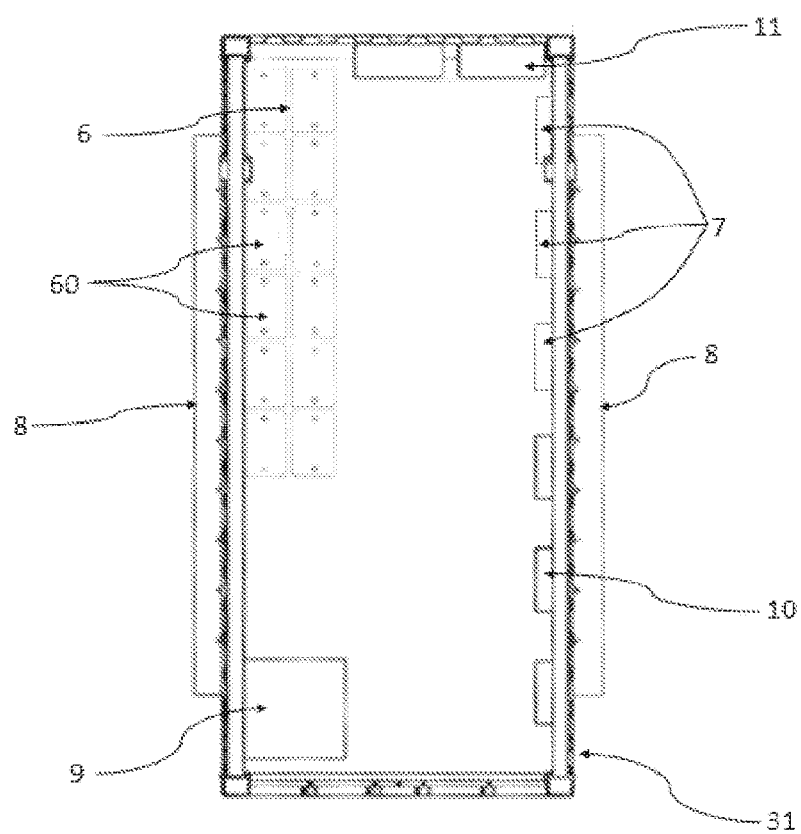
FIG. 2 is a schematic representation, seen from above, of a container serving as a support for the means for generating electricity, and the elements that may be enclosed inside said container.

The supporting element 3, in this case said containers 31, 32, of the device 1, in addition to their support function for the photovoltaic panels 20, may enclose a number of elements, or components, of the device 1, as shown in FIG. 2.

Anyway, it can be considered to have, in the containers 31, 32, all the equipment necessary for the mounting and operation of the device 1 for generating, storing and distributing electrical power according to the invention, which necessarily results into a reduction of the costs of transport, manufacture, and installation of said device 1.

In addition, a large majority of the equipment the device 1 is comprised of will be mounted in the factory in order to facilitate the installation on site and only the elements placed outside the supporting element or elements 3 will be transported inside said supporting elements 3 and mounted on site.

Thus, namely at least one of the two containers 31, 32 encloses at least one means 6 for internal storage of the electrical power generated by said generation means 2, which said storage means 6 is electrically connected to.

Preferably, said internal storage means 6 consists of a plurality of internal storage batteries 60, the latter permitting a regulation of the photovoltaic energy being generated, a storage of the electrical power in case of overproduction with respect to the needs, and the recovering of this energy in case of peaks of consumption or insufficient generation by the electrical power generation means 2.

These internal storage batteries 60 are namely capable of compensating for the lack of electrical power generation by the photovoltaic panels 20 during less sunny days and permit to supply electrical power necessary during the day of use, and in the evening, when said panels 20 no longer generate electricity.

Preferably, the operation of the internal storage batteries 60 is optimized, in the device 1 of the invention, by charge regulators 10 integrated in charge inverters connected to the generation means 2 and which are associated with each of said batteries 60. The role and the operation of these regulators 10 will be described in more detail below.

All the internal storage batteries 60 may be enclosed in one of the two containers, for example in container 31, as is shown in the attached FIG. 2, or also be distributed between the two containers 31, 32, according to a different embodiment, not shown.

In addition to the internal storage batteries 60, said supporting element 3, preferably in the form of at least one and yet more preferably two containers 31, 32, also encloses at least one inverter 7, electrically connected to the power generation means 2, and capable of converting the direct current, generated by the photovoltaic panels 20, into an alternating current, which is supplied to at least one electrical connector 8, for example in the form of charging plugs for movable batteries, said electrical connector or connectors 8 being part of the device 1 of the invention, as well as said movable batteries.

In particular, the inverters 7 are equipped with a program such as MPPT (Maximum Power Point Tracking), which is constantly tracking the maximum power point of the photovoltaic panels 20.

As regards now the movable batteries, external to the device 1, they are not shown in the figures. However, they are intended to be entrusted to the people living around the place where the device 1 of the invention is implanted. Said movable batteries will thus permit to supply the houses in the non-connected areas with electricity.

Only these movable batteries, specifically adapted for the device 1 of the invention, can be connected to the electrical connector(s) 8. It is thus expected that other personal devices belonging to the users, such as phones or laptops, cannot be connected to said electrical connectors 8.

These external movable batteries are, for example, Li-Ion technology 400 Wh portable batteries, or equivalent, equipped with USB ports and preferably with a handle for facilitating the transport of said battery. In addition, these movable batteries can be of varied colors, in order to facilitate their identification by their owner.

The USB ports permit to supply with power, for example, a lighting system, for example based on LEDs ("light-emitting diodes"). The lighting system consists of a USB cable electrically connected to LEDs with a power, for example, of at least 15 W in total, and having the capacity of illuminating an area of at least 50 m$^2$. The other USB ports the movable battery is provided with can permit to charge small electronic devices (such as phones or laptops, tablets, etc.).

Most preferably, the movable batteries intended to be associated with the device 1 of the invention are dimensioned for a use defined as follows: power supply to the above-mentioned lighting system for a 6 hours' period per day, for example, and daily recharging of two or three small portable electronic devices. A digital indicator can be placed on the movable battery to indicate its percentage of charge.

Turning back to the electrical connectors 8, which said movable batteries are intended to be connected to, they are specifically designed for charging only movable batteries associated with the device 1 of the invention.

In order for only movable batteries forming part of the device 1 of the invention to be able to be connected to the electrical connectors, the latter can, for example, but not restrictively, be provided with at least one coded pin impeding any connection of electrical appliances other than said external movable batteries.

The latter can also, or alternatively, be provided with an identifier, such as a barcode, which must imperatively be recognized by an identification means, which said device 1 is provided with, so that the connector 8, which said movable battery is connected to, is supplied with electricity in order to permit a recharging of said external movable battery.

This particular feature of the device 1 of the invention, namely the fact that it includes a plurality of dedicated movable batteries, thus permits to avoid another or untimely use of the energy generated by said device 1, and to guarantee that each user being given such a movable battery can recharge it at regular intervals of time, as will be explained in more detail below.

Therefore, no other load, except said movable batteries, is allowed on the device 1 of the present invention.

Advantageously, the electrical connectors intended to ensure the recharging of said external batteries are positioned on at least one of the outer faces of at least one of the containers 31, 32.

Thus, for example, as shown in FIGS. 1, 2 and 3, each of the containers 31, 32 includes twenty electrical connectors 8, distributed over the two longest outer faces of said containers 31, 32. In other words, each the longest faces of each of the containers 31, 32 can be provided with ten electrical connectors 8.

In addition to said electrical connectors 8, which, for the record, are supplied with electrical power either via the photovoltaic panels 20, after a conversion of the DC signal into an AC signal by at least one inverter 7, or through the energy stored in the storage batteries 60 and redistributed by at least one charge regulator, which is in practice integrated in an inverter, said device 1 of the invention may also include at least one additional component. The latter may consist, for example, of at least one refrigerator 9 and/or at least one ventilation means and/or at least electronic telecommunication means and/or at least one lighting and/or at least one means, such as a barcode reader, for identifying an external device, in this case the movable batteries.

Said refrigerator 9, the access to which can advantageously be assigned only to authorized persons, has preferably a capacity of at least 0.5 m³ and its function is to permit, for example, the preservation of medicinal products and/or vaccines and can also be used for any type of cold storage.

As regards now said electronic telecommunication means, they include at least one WEB server, a WIFI router and an internet router, and their function is to permit the users present near the device 1 and who come, for example, for recharging the movable battery that they have been assigned, to connect to the internet (to download or upload documents, emails, etc.), and to wait during the charging time of their personal movable battery.

In addition, particularly advantageously, said electronic telecommunication means are capable of permitting, on the one hand, the remote transfer in real time of various data related to the operation of the device 1, such as the generation of electrical power, the state of charge of the internal storage batteries and, on the other hand, a remote dialogue and control of the device by specialists.

This provides additional safety for the operator and the users of the device 1, since there is a permanent analysis of the vitality of the various electrical, electronic and computer organs. Checking the compliance with the field of operation of this equipment permits to anticipate any breakdown or breakage by proceeding immediately to the shutdown of said equipment exhibiting a failure. This locking device is automated and controlled by a remotely located server, in the central station that has been discussed above.

Finally, in order to proceed to the continuous improvement of the device 1 and the algorithm managing the power generation/power consumption pair, the hours of the connections and disconnections of the movable batteries and the internet access by the users are taken into consideration.

In practice, the controlling system performs a storage of the exact hours and days of actual connections of the batteries (voltage and intensity) and recharging periods as well as the hours and days of the connections to the WIFI network. It then sends these data and this information by radio-telecommunications namely for purposes of behavioral analysis of users, which permit the continuous improvement of the algorithm of the device managing said pair of electricity generation of the device/consumption of the device.

As regards the identification means, its role and operation will be detailed later in the description.

Anyway, since the various above-mentioned additional components also require an electrical power supply according to an AC signal, they are also connected to at least one inverter 7 or to the storage batteries 60, for a power supply via the photovoltaic panels 20 or via said batteries 60, depending on the available electrical power.

In addition, it should be noted that, particularly advantageously due to the original design of the present device, these elements may be enclosed in the supporting element 3 of said device 1.

In the advantageous embodiment shown in the figures, these elements may be enclosed in either one of the containers 31, 32 acting as a supporting element 3.

In addition and essentially, the distribution of the electrical power that is generated by the generation means 2, in other words by the photovoltaic panels 20, to the various elements of the device 1 of the invention, storage batteries 60, electrical connectors 8, etc., is managed by a controlling system that includes, at least, means for managing the storage and distribution of the electrical power generated by said generation means 2.

Indeed, namely according to the time of day, the electrical power generated by the panels 20, the charge of the internal storage batteries 60, the electrical power demand of the various consumers, i.e. namely the internal organs of the device 1, the movable batteries being recharged, the electronic telecommunication, the refrigerator(s), etc., vary.

Therefore, the function of the controlling system is to manage the distribution of the directly generated electrical power in order to assign it by priority to the different loads and, for the excess capacity being generated, to the recharging of the internal storage batteries 60. Alternatively, the system manages the distribution of electrical power from the storage batteries 60 to the different loads at least for the internal operation of the device 1 and, when the energy capacity is sufficient, to the different loads, namely the electrical connectors 8.

To this end, in a particularly interesting embodiment, said means for managing the electrical power storage and distribution of the controlling system comprise, at least:

- a server, which is preferably in communication with a communication box, which, in turn, receives, for example by Bluetooth, information from at least the outlet of the inverters 7;
- a plurality of microcontrollers, which are, in turn, under the control of said server and controlled by the latter, for example in IP;
- a relay for each electrical connector 8, the relays being controlled by a microcontroller, knowing that a microcontroller can control a single relay or a plurality of relays. A relay permits to supply or not an electrical connector 8 with power. The inlets of the relays are advantageously installed in an electrical box 11;
- eventually a relay connected to each of the optional additional components of the device 1 mentioned above, namely for example at least one refrigerator 9 and/or ventilation means and/or electronic telecommunication means and/or lighting and/or an identification means, such as a barcode reader for the movable batteries;
- a charge and discharge regulator 10 for each internal electrical power storage means 6, in other words for each storage battery 60, said regulator 10, associated with an inverter-charger, permitting to avoid too large discharges of the batteries 60 that would be likely to reduce the life of the storage battery 60. The charge regulator 10 of each storage battery 60 namely checks the voltage at the outlet of said battery 60 and manages the distribution of the electricity generated by the photovoltaic panels 20. The regulator 10 and its associated inverter also communicate with the server in IP.

Said means for managing the electrical power storage and distribution manage, via software modules:

- the distribution of the photovoltaic power between, on the one hand, the storage batteries 60 and, on the other hand, the various internal operating organs of the device 1, the electrical connectors 8 for recharging the movable batteries and/or the electronic telecommunication means and/or the electrical power supply to the additional components (refrigerator 9, etc.);
- the charging of the movable batteries via the electrical connectors 8;
- the information related to the generation of electricity, the operating mode of the components of the device (batteries, inverters, regulators, etc.) and any breakdowns in the event of malfunction.

Thus, namely when the generation of electricity by the solar panels 20 is higher than the overall electrical power demand of the device 1, which represents, for example, the electrical power consumed for the internal operation (microcontrollers, energy meters, LEDs, server, etc.) of the device 1 and/or the electrical power drawn by the different charges (movable battery recharging, electronic telecommunication, refrigerator, ventilation), the extra electrical power is stored in the internal storage batteries 60. In practice, the device 1 itself, i.e. the various internal organs dedicated to its proper operation, consumes a significant part of the electrical power each day only for its operation, and represents the main load, before the connectors/batteries and radio-telecommunication.

When, on the other hand, the power generated by the panels 20 is not sufficient to support the load of the various above-mentioned components of the device 1, the internal storage batteries 60 intervene in order to deliver the electrical energy that remains to be supplied.

According to a particular embodiment, said electrical power storage and distribution management means include two energy meters associated with each of the electrical connectors 8, one of the two meters being redundant in the event of failure of the first one, said meters being advantageously electrically connected to the server.

Each meter is capable, on the one hand, of recording the distributed energy, the current and the voltage delivered to the connector 8, which it is associated with, and, on the other hand, of sending the recorded information to the server.

This permits to determine the state of charge of a movable battery connected to an electrical connector 8 and, hence, to suspend the power supply to said connector 8 when said movable battery is at the end of charging.

In addition and advantageously, the values that are transmitted to the server by the meters also permit to provide information on the behavior of the users and the operation, at a given moment I, of the device 1 of the invention, such as the time and the charging time of the movable batteries, the electrical energy distributed to each movable battery, or also the total electrical energy distributed in a day by said device 1. Said information is transmitted by the radio-telecommunication system in real time.

In order to manage the distribution of electricity in the device 1 of the invention, the controlling system will constantly check the state of charge of the internal storage means 6 in order to supply or not elements such as the electrical connectors 8, the electronic telecommunication means, the refrigerator 9, etc., with power.

The instruction to supply with power occurs via the microcontrollers controlled by the server in IP and which the relays are connected to, a relay being associated with each connector 8 and with other components of the device 1.

A threshold value S1 of the electrical energy required for the minimum operation of the entire device 1 of the invention must always be available, globally, in the internal storage means 6, in order to be able to anticipate a sudden drop in power generation by the photovoltaic panels 20, for example due to a passing-by of clouds.

The electrical energy stored at the threshold value S1 will permit to ensure the supply of power to the means of the controlling system of the device 1, namely the server, the microcontrollers, the meters, etc., in particular when the photovoltaic panels 20 no longer generate power, namely during the night.

This threshold value S1 corresponds to a determined capacity of the internal storage batteries 60. It can vary depending on the hours of the day and, in an exemplary embodiment, it has been defined by simulation: for example, from 8 am to 3 pm a threshold value S1 has been determined and, from 3 pm to 6 pm, a threshold value, for example S1', higher than the threshold value S1, has been determined.

The controlling system can thus determine the actions to be taken depending on the state of charge of the storage batteries 60 and the hours of the day.

From 8 am to 3 pm, for example, when the energy available in the internal storage batteries 60 is below the threshold value S1, the system enters into a state of disconnection. This state permits to disconnect the different loads according to an accurate protocol in order to permit the storage batteries 60 to recharge until they reach an available energy higher than the threshold value S1 and referred to as value S2. Advantageously, the disconnection protocol is as follows:

Phase 1: The server interrogates the power supply system of the electronic telecommunication device, such as Wifi/GPRS server, to see if it is powered or not. In the event it is powered, the server disconnects it for 20 minutes. After 20 minutes, the server interrogates the storage means 6 and checks the available electric energy. If the storage means 6 have reached a capacity higher than the threshold value S1, in practice a predetermined value S2, the electronic telecommunication means are reconnected. If it is not the case, the electronic telecommunication means remain disconnected and we go to phase 2. The value S2 to be reached leads to leaving available an energy buffer "zone" (S2–S1) permitting to prevent the system from inadvertently connecting and disconnecting the devices, accelerating equipment aging.

Phase 2: The server interrogates the power supply systems of the electrical connectors 8 in order to determine the connectors 8 that are powered and those that are not. In the event no connector 8 is powered, we go to phase 3. Otherwise, the server interrogates the powered electrical connectors 8 and detects the two connectors 8 ($n_1=2$) that have the longest charging time. These connectors 8 are disconnected for 20 minutes. After 20 minutes, the server interrogates the storage means 6 and checks the available electrical energy. If the storage means 6 have reached a capacity higher than or equal to the value S2, the connectors 8 are reconnected as well as the electronic telecommunication means. If it is not the case, the server resumes the disconnection phase 2 by incrementing by 2 ($n_2=2$) the number of disconnected electrical connectors, while keeping the electronic communication means disconnected as long as the storage means 6 have not reached a capacity higher than or equal to the value S2. When this capacity has been reached, all the connectors 8 that have been disconnected, and the electronic communication means, are again powered. If said capacity is not reached, the server repeats the disconnection phase 2 in closed loop until all the electrical connectors 8 are shut down in operation (i.e. connected to a device such as a movable battery) and the controlling system then goes to phase 3.

Phase 3: The server interrogates the power system of the refrigerator 9 in order to check that it is powered. If the refrigerator 9 is not powered, we go to phase 4. If the refrigerator 9 is powered, the server instructs the power system of the refrigerator 9 to no longer power for 20 minutes. After 20 minutes, the server interrogates the storage means 6. If they have a capacity higher than the value S2, the server supplies power again to the electronic telecommunications means, the connectors 8 that have been disconnected as well as the refrigerator 9. Otherwise, the refrigerator 9 remains disconnected and we go to phase 4.

Phase 4: The energy available in the storage means 6 is not sufficient to ensure the power supply to the control elements in the event of insufficient generation by the photovoltaic panels 20. The server sends an alarm to the operator, by remote control in its central station, in order to report insufficient energy in the storage means 6, then all the sensors are disconnected, except the energy sensors of the storage means 6. When the latter have reached the value S2, all the elements that have been disconnected are powered again.

In the event of total disconnection resulting from a zero electrical energy in the storage means 6 and a zero photovoltaic power generation, the server and the various organs of the device 1 restart as soon as they are again powered with electrical energy.

In addition, due to intermittent photovoltaic electric power generation, and in order to optimize both the number of solar panels 20 and the capacity of the internal storage batteries 60, only a portion of the movable batteries that are distributed to the inhabitants can be charged per day, in comparison with all the movable batteries that are associated with the device 1.

Throughout the day, the power supply to the electrical connectors 8, and thus the charge of the movable batteries connected thereto, is managed by the management means of the controlling system of the device 1 depending on the energy available in the storage batteries 60.

An optimal use of the movable batteries as defined above in the detailed description, i.e. powering a lighting system and recharging small electronic devices, permits said movable batteries to have several days of autonomy, in particular of three days.

The recharging of a movable battery by the device 1 of the invention is thus advantageously authorized every three days by the controlling system.

To this end, the movable batteries are provided with an identifier such as a barcode and, for the record, said device 1 is provided with at least one identification means, such as a barcode reader, capable of decrypting the identifier on each movable battery.

Advantageously, said identification means, in the form of at least one barcode reader provided with at least one display means, such as a screen, is positioned on the supporting element 3, in this case on at least either one of the containers 31, 32, in the preferred embodiment in which the device 1 comprises two containers 31, 32, as a supporting element 3.

When a movable battery has to be recharged, the identifier on said battery is passed in front of the identification means.

The latter sends the decrypted identification of the movable battery to the controlling system, for example via a USB connection, which checks in the database that the identifier corresponds to a movable battery that has been recharged, for example, three days ago.

In the event the last recharge took place less than or more than three days ago, the controlling system sends an error message to be displayed on the screen of the identification means to indicate the refusal of charging and the day of the next possible charge for the movable battery in question.

This refusal is also part of the information that is collected and sent to a database of the server, as well as the date T and the precise time t1 at which the movable battery has been identified.

However, the date of the last charge remains unchanged.

In the event the last recharge occurred three days ago, the controlling system records the date and time of the reading of the identified movable battery in the database of the server and permits the recharge of the movable battery in question.

Like for the management of the charge and the discharge of the internal storage batteries 60, the controlling system manages the supply of power to the electrical connectors 8 for recharging the movable batteries via the microcontrollers, which relays are connected to, said microcontrollers being controlled by the server in IP.

Preferably, a number is assigned to each of the electrical connectors 8 intended to receive the movable batteries for recharging. These numbers are written on the supporting element 3, for example on the containers 31, 32, on the faces of which the connectors 8 are positioned and in the database.

When the charging of a movable battery has been authorized, the server identifies a not yet powered electrical connector 8 and then sends the information, i.e. the number of the identified connector 8, to a display means, for example, but not exclusively to the screen associated with the identification means, and located on one of the faces of the supporting element 3.

Advantageously, around each of the electrical connectors 8 are arranged one or several LEDs that light up, or not, depending on the state of the connector 8. Most preferably, these LEDs are also managed by the controlling system, through the microcontrollers controlled in IP by the server and connected to relays.

When an electrical connector 8 is assigned to a movable battery, the corresponding LED or LEDs blink, for example, thus permitting to facilitate the detection of the connector 8.

The server then advantageously checks that the power to be supplied to power the electrical connector 8 is available and that the controlling system is not in the disconnected state to cope with insufficient electrical energy available in the internal storage battery 60 below the threshold value.

These two parameters will define the supply or not of power to the connector 8:

State of disconnection or insufficient electrical power to supply the connector 8 with power: the server instructs the blinking of the LEDs located around the electrical connector 8 assigned to the charging of the movable battery. As long as the disconnection state is not cleared, the electrical connector 8 is not powered, the LEDs continue to blink and the server does not retrieve the time of beginning of the charging. When the disconnection state is cleared, the controlling program applies the protocol for the state of connection as defined below:

State of connection and sufficient electrical power to power the electrical connector 8: the server instructs the blinking of the LEDs located around the electrical connector 8 assigned to the charging of the movable battery. The server retrieves the time at which said movable battery has been identified as well as the value of the charge current displayed on the meter of the electrical connector 8 assigned to the battery in question. During a period of m minutes, for example between 1 and 4 min, preferably for 2 min, after the time of identification of the movable battery, the server interrogates in closed-loop the value of the charge current of the meter of the electrical connector 8 assigned to the charging of the battery.

If this charge current value is higher than the previous value, this means that the movable battery has been connected to the electrical connector 8, and that said battery is indeed charged. The server thus records the date and time of the day as the date and time of the last charge and instructs the LEDs to go from the flashing state to the ON state. The server will regularly check the meter in order to check the state of charge of the movable battery by noting a decrease in charge current. When the charge current decreases, the electrical connector 8 is no longer powered and the movable battery is considered charged. If the charge current does not decrease after 4 hours of effective connection (excluding the disconnection), the electrical connector 8 is nevertheless disconnected and the movable battery is considered charged.

If the meter value is the same as the previous value, this means that the movable battery has not been connected. The server stops the power supply to the electrical connector 8 and indicates in the database the non-connection of the movable battery. However, the server will not record the date as the date of the last charge, but will keep the previous date.

The autonomous device 1 for generating, storing and distributing electricity according to the present invention is particularly advantageous. As has been demonstrated in the foregoing description of the invention, this is a fully autonomous, compact device 1 easy to be installed and used, permitting to bring electrical energy to remote areas of developing countries and lacking a sufficiently developed network.

More specifically, the elements of the device 1, and namely the supporting element 3, which may consist of containers 31, 32 that are easily transportable by land and/or sea, may include all the equipment necessary for the mounting and operation of the device 1.

Of course, the invention is not limited to the examples shown and described above, which may have variants and modifications without departing from the scope of the invention.

Thus, for example, the device 1 according to the invention described in detail above can be provided with a water treatment system, for example a reverse osmosis type salt water treatment system. Such a system permits to treat salt water to convert it into drinking water and can be installed in the supporting element 3 of the device 1, in other words in either one of the containers 31, 32.

In this embodiment, the water treatment system can be powered by the solar energy generated by the photovoltaic panels 20 and/or by the electrical energy stored in the internal storage means 6. In addition, it can then be considered to provide the arrangement of a ramp of ten taps on the outer face of either one of the containers 31, 32 for its distribution.

The controlling system of the device 1 of the invention will then be programmed to accommodate the distribution of electrical energy between the electrical connectors 8 and/or the water treatment system, and/or the refrigerator(s) and/or the electronic telecommunication means, etc.

In another example, where the device 1 is implanted inside a land and is located near a water point other than salt water, the water treatment system is replaced by pumping means.

In all cases of configuration, the invention is easy to be implemented on site, because the containers are largely pre-assembled in the factory, in advance. This permits very small on-site assembly operations, only related to a few elements that are not assembled in the factory and transported in the device 1, which must therefore be installed on the site of electrical power generation.

It should also be emphasized that the devices according to the invention are dimensioned so that the photovoltaic electrical power generation covers at any time t all the charges (internal organs and/or electrical connectors and/or electronic telecommunication means and/or refrigerator, etc.) and permit to ensure electrical energy for all users associated with the device—i.e. eligible for an identifier—and whose number has been maximized and predetermined for each device.

The invention claimed is:

1. An autonomous device for generation, storage and distribution of electrical power, wherein the device comprises:
   at least one supporting element,
   means for generating electrical power, resting on the at least one supporting element,
   the supporting element enclosing means for internal storage of the electrical power generated by the generation means, the supporting element also enclosing means for converting signals from the generation means into signals capable of supplying power to the electrical power storage means,
   at least one electrical connector for connecting the device to external electrical power storage devices, and
   electronic telecommunications means,
   wherein the supporting element also incorporates a controlling system comprising means for managing storage and distribution of the electrical power generated by the generation means connected to sensors provided on a plurality of components of the device for measuring operating parameters, the controlling system comprising means for identification of the external electrical power storage devices, and
   wherein the external electrical power storage devices are movable batteries forming an integral part of the device, wherein each of the movable batteries includes an identifier capable of being identified by the means for identification of the controlling system, the controlling system being capable of authorizing or refusing charging of the movable batteries, the movable batteries being the only load capable of being charged by the at least one electrical connector.

2. The device according to claim 1, wherein the controlling system comprises at least one server controlling (i) a plurality of microcontrollers controlling opening/closing means for at least electrical lines associated with each electrical connector, and (ii) at least one charge and discharge regulator for the internal storage means.

3. The device according to claim 1, wherein the signal converting means comprise at least one inverter connected downstream of the generation means and upstream of the electrical connectors and at least one charge regulator connected between the inverters of the generation means and the internal storage means.

4. The device according to claim 2, wherein, on each electrical line, downstream of the signal converting means, at least one meter is connected upstream of a relay, a circuit breaker being connected between the at least one meter and the relay.

5. The device according to claim 1, wherein the supporting element also encloses electrical lines supplying power to at least one selected from the group consisting of at least one refrigerator, at least one ventilation means, and at least one lighting.

6. The device according to claim 1, wherein the electronic communication means include at least a WEB server, a WIFI router and an internet router.

7. The device according to claim 1, wherein the means for managing the storage and distribution of electrical power comprise voltage, current, and energy sensors.

8. The device according to claim 1, wherein the supporting elements include two containers to which is fixed a structure for holding and fastening a plurality of photovoltaic panels, the electrical connectors being positioned on outer faces of at least one of the two containers.

9. The device according to claim 1, wherein the identification means further including display means.

10. The device according to claim 1, wherein the electrical connectors include detection means, such as LEDs, managed by the controlling system.

11. A method for managing the electrical energy generated by an autonomous device for generation, storage and distribution of electrical power,
wherein the device comprises:
at least one supporting element,
means for generating electrical power, resting on the at least one supporting element,
the supporting element enclosing means for internal storage of the electrical power generated by the generation means, the supporting element also enclosing means for converting signals from the generation means into signals capable of supplying power to the electrical power storage means,
at least one electrical connector for connecting the device to external electrical power storage devices, and
electronic telecommunications means,
wherein the supporting element also incorporates a controlling system comprising means for managing storage and distribution of the electrical power generated by the generation means connected to sensors provided on a plurality of components of the device for measuring operating parameters, and
wherein the external electrical power storage devices are movable batteries forming an integral part of the device and including at least one selected from the group consisting of an identifier capable of being identified by means for identification of the controlling system and connection means specific to the at least one electrical connector,
the method comprising:
setting a first threshold value S1 for a level of power available in the internal storage means necessary for operation of the device;
setting a second value S2 for the level of power available in the internal storage means so that S2>S1;
when the level of power available in the internal storage means drops below the first threshold value S1, disconnecting the electronic telecommunication means for a first predetermined period of time d1, then closed-loop controlling the level of power available in the internal storage means at the end of the first period of time d1, and reconnecting the electronic telecommunication means if the level is higher than the second value S2;
if the level of power available in the internal storage means is still lower than the second value S2, detecting a number of electrical connectors in an active phase of supplying a load, and calculating their supply time $t_a$;
disconnecting the $n_1$ electrical connectors having the highest supply times $t_a$ for a second predetermined period of time d2, then closed-loop controlling the level of power available in the internal storage means at the end of the second period of time d2 and, if the value S2 is not reached, resuming the disconnecting while incrementing by $n_2$ the number of disconnected electrical connectors, while keeping the electronic communication means disconnected;
reconnecting the disconnected electrical connectors and the electronic telecommunication means as soon as the level of power available in the internal storage means is higher than or equal to the second value S2;
if no electrical connector is any longer in the active phase of supplying a load, controlling a supply line of a refrigerator and disconnecting the supply line if the refrigerator is powered, for a third predetermined period of time d3, then closed-loop controlling the level of power available in the internal storage means at the end of the third period of time d3, and reconnecting the refrigerator, all the electrical connectors and the electronic telecommunication means as soon as the level of power available in the internal storage means is higher than the second value S2;
if the level of power available in the internal storage means is still lower than the second value S2, sending a warning of insufficient power and disconnecting the sensors, except the power sensors of the internal storage means, then closed-loop controlling the level of power available in the internal storage means and reconnecting the disconnected electrical connectors as soon as the level of power is higher than the second value S2;
in case of detection of a zero power in the internal storage means and if the power generation is zero, the server and the various organs of the device restart as soon as they are anew supplied with electrical power.

12. The method for managing the electrical energy according to claim 11, wherein the values S1 and S2 are varying according to defined time slots in a time period corresponding to one day.

13. The method for managing the electrical energy according to claim 11, wherein:
the first threshold value S1 varies between 1 and 8 kWh;
the second value S2 is higher than or equal to S1+1 kWh and varies between 2 and 10 kWh;
the first predetermined period of time d1 varies between 2 minutes and 30 minutes;
the second predetermined period of time d2 varies between 2 minutes and 30 minutes;
the third predetermined period of time d3 varies between 2 minutes and 30 minutes.

14. The method for managing the electrical energy according to claim 11, comprising, for charging the external power storage means:
reading, by the identification means, the identifier of one of the external electrical power storage devices and recording the time t1 and the date T of reading;
controlling, by the controlling system, the last date M of charging of the external electrical power storage device;

calculating a period of time D=T−M and comparing D with a predetermined period of time L imposed between two charges;

refusing the charging if D is different from L, and sending, by the controlling system, and displaying on the display means, a message indicating the next authorized date;

otherwise, performing, by the controlling system, a storing of the time of identification, then an assignment and display of the electrical connector assigned through activation of detection means of the electrical connector.

15. The method for managing the electrical energy according to claim 14, comprising:

identifying a meter corresponding to the assigned electrical connector and storing a count value v1 of the charge current and the time t1;

closed-loop controlling for a predetermined time between 1 min and 4 min a count value of the charge current v2, and comparing with v1;

if v2>v1, storing the time t2 and the date of the day as the last date M of charging of the external electrical power storage device, otherwise stopping the power supply to the electrical connector without storing the date of charging;

closed-loop controlling the value of the charge current and, as soon as the value of the charge current decreases, stopping the power supply to the electrical connector and storing the time t3 of stopping;

if the charge current does not decrease after a predetermined period of time starting at time t2, stopping the power supply to the electrical connector, and storing the time t3 of stopping.

16. The method for managing the electrical energy according to claim 15, wherein the dates and times are stored by the controlling system and sent via the electronic telecommunication means.

17. The method according to claim 11, wherein the device or devices are connected via the electronic telecommunication means to a central station, to which the operating parameters as well as the dates and times stored by the controlling system are sent, and from which values of the operating parameters of the device can be re-parameterized.

18. The method according to claim 11, wherein the means for generating electrical power is a set of photovoltaic panels, and the supporting element is at least one standardized shipping container.

19. The device according to claim 1, wherein the means for generating electrical power is a set of photovoltaic panels.

20. The device according to claim 19, wherein the supporting element is at least one standardized shipping container.

21. The method according to claim 11, wherein the identification means comprises a display means.

22. The method according to claim 11, wherein, in the device, the supporting elements include two containers to which is fixed a structure for holding and fastening a plurality of photovoltaic panels, the electrical connectors being positioned on outer faces of at least one of the two containers.

23. An autonomous device for generation, storage and distribution of electrical power, wherein the device comprises:

at least one supporting element, means for generating electrical power, resting on the at least one supporting element, the supporting element enclosing means for internal storage of the electrical power generated by the generation means, the supporting element also enclosing means for converting signals from the generation means into signals capable of supplying power to the electrical power storage means, at least one electrical connector for connecting the device to external electrical power storage devices, and electronic telecommunications means, wherein the supporting element also incorporates a controlling system comprising means for managing storage and distribution of the electrical power generated by the generation means connected to sensors provided on a plurality of components of the device for measuring operating parameters, and wherein the external electrical power storage devices are movable batteries forming an integral part of the device and including at least one selected from the group consisting of an identifier capable of being identified by means for identification of the controlling system and connection means specific to the at least one electrical connector, wherein the supporting elements include two containers to which is fixed a structure for holding and fastening a plurality of photovoltaic panels, the electrical connectors being positioned on outer faces of at least one of the two containers.

* * * * *